United States Patent

[11] 3,570,368

[72] Inventor Edward C. Clark
1015 Springfield St., Dayton, Ohio 45403
[21] Appl. No. 854,059
[22] Filed Aug. 29, 1969
[45] Patented Mar. 16, 1971

[54] DUPLICATING APPARATUS
19 Claims, 4 Drawing Figs.
[52] U.S. Cl. .................................................. 90/13.1,
90/62, 33/25R
[51] Int. Cl. .................................................. B23c 1/16
[50] Field of Search ........................................ 90/13.1, 62,
13; 33/23 (R), 25 (R), 25 (B), 25 (C), 25 (D), 25 (E)

[56] References Cited
UNITED STATES PATENTS

| | | | |
|---|---|---|---|
| 1,972,910 | 9/1934 | Zwick | 33/25EX |
| 2,812,694 | 11/1957 | Reichard et al. | 90/62X |
| 2,828,673 | 4/1958 | Campbell | 90/62X |
| 3,417,661 | 12/1968 | Dancsik | 33/25RX |

Primary Examiner—Gil Weidenfeld
Attorney—Marechal, Biebel, French & Bugg

ABSTRACT: A vertical turret milling machine having a horizontal support arbor is provided with a three dimensional duplicating device including a bracket which mounts on one end of the arbor and supports antifriction cylindrical bearings on opposite sides of the arbor for receiving parallel spaced cylindrical guide rods. A first vertical plate member rigidly connects the forward ends of the guide rods and supports an adjacent second vertical plate member for lateral movement. A third vertical platelike head member is supported by the adjacent second plate member for vertical movement and carries a rotatable spindle and a stylus positioned in horizontally spaced relation above the table of the machine. An overhead beam is pivotally supported by the mounting bracket and is connected to the head member by a linkage system positioned in a vertical plane and provided with a handle for controlling the lateral, to-and-fro and vertical movements of the head member. A weight is adjustably mounted on the beam to counterbalance the head member, and the spindle is driven by a belt connected to the milling machine motor mounted on the opposite end of the arbor.

Patented March 16, 1971

INVENTOR
EDWARD C. CLARK
BY
Marechal, Biebel, French & Bugg
ATTORNEYS

Patented March 16, 1971

DUPLICATING APPARATUS

BACKGROUND OF THE INVENTION

In the production of metal stamping dies, aluminum die-cast dies, plastic molds and the like, it is common to first make a wooden or plastic model and to employ a duplicating machine which has a horizontal table on which the workpiece and model are clamped in spaced relation. Normally, the machine incorporates a head which carries a stylus for engaging the model and a driven spindle which receives an end mill or cutter for machining the workpiece according to the configuration of the model as the stylus is moved over the surface of the model. While various types of duplicating machines have been devised, usually the machines have one or more disadvantages. For example, the machines commonly do not provide sufficient rigidity in combination with a sensitive manual control for machining the workpiece at a rapid cutting rate and with precise accuracy corresponding to the configuration of the model. Furthermore, many machines are complex and expensive in construction, such as the duplicating machines which employ one set of stylus and spindle for rough machining and another set of stylus and spindle for finishing those machines which employ hydraulically controlled movements.

SUMMARY OF THE INVENTION

The present invention is directed to an improved duplicating device adapted to be attached to a vertical turret milling machine and which thereby adapts the machine for three-dimensional machining of a workpiece according to the configuration of a model as well as two-dimensional profiling. The duplicating device of the invention is substantially rigid in construction for providing a high machining rate and incorporates a balanced and sensitive control system which provides for precision duplicating. The duplicating device of the invention also provides for adjustably positioning the stylus in three directions relative to the spindle to minimize the time for setting up a machining operation, and also provides for angularly positioning the stylus and the spindle on corresponding parallel axes according to the contour of the model.

According to one embodiment of the invention, a bracket member is mounted on one end of the ram or arbor which extends horizontally through the rotary turret head of a vertical turret milling machine. A pair of antifriction cylindrical bearings are mounted on the bracket and support a corresponding pair of parallel spaced guide rods arranged on opposite sides of the arbor. A vertical plate member rigidly connects the forward ends of the guide rods and carries antifriction linear bearings which support a second or intermediate plate member for lateral movement. A third platelike head member is supported for vertical movement by linear antifriction bearings mounted on the intermediate plate member and carries a rotary spindle arranged in parallel spaced relation to a stylus supporting member.

A post or column is mounted on the bracket member above the arbor and supports an overhead horizontal beam member for pivotal movement on a horizontal axis. The forward end portion of the beam member is connected to the head member by a parallelogramlike linkage mechanism or system which is disposed within a vertical plane extending normally through the axis of the arbor. A vertical handle depends from the linkage system and provides a conveniently located and sensitive control of the movement of the head member in lateral, to-and-fro and vertical directions relative to the table of the milling machine. A weight member is mounted on the rearward end portion of the beam member and serves to counterbalance the combined weight of the head member, the linkage system and the components carried by the head member. Means are provided to lock the movement of the head member in each of the three directions, and additional means are provided for adjusting the limits of travel of the head member in each of the three directions.

DESCRIPTION OF THE PREFERRED EMBODIMENT

Figure 1:
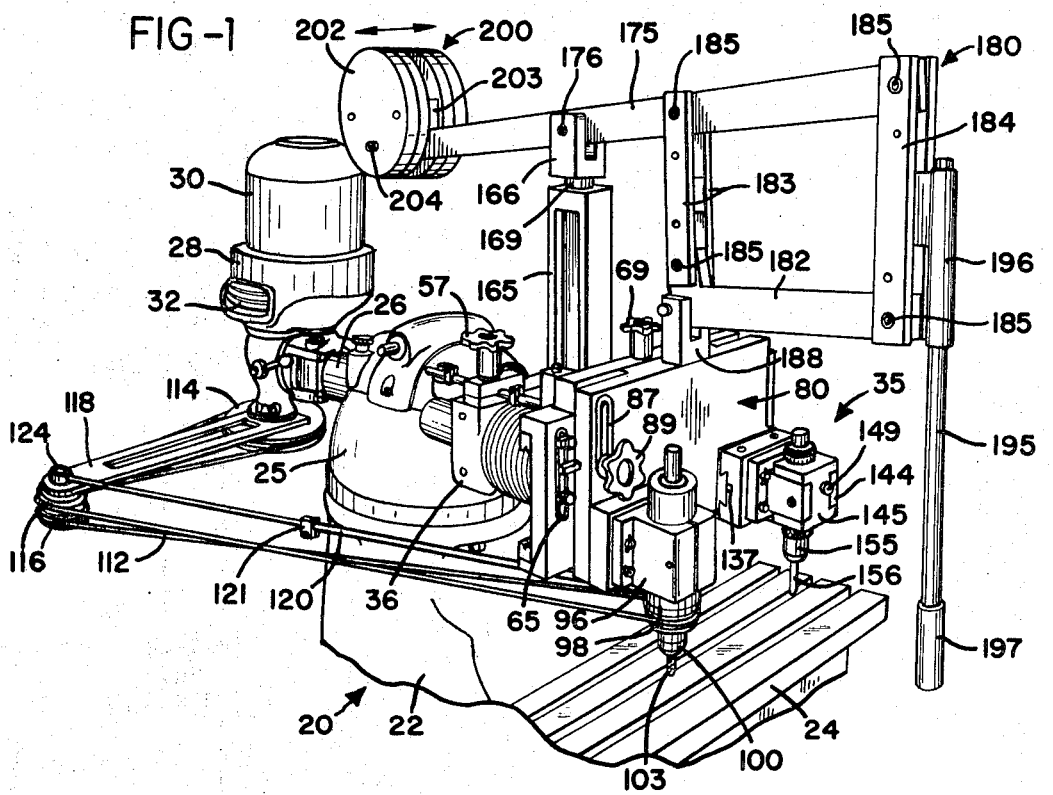
FIG. 1 is a perspective view of a duplicating machine constructed in accordance with the invention and mounted on the horizontal arbor of a vertical turret milling machine.

Referring to FIG. 1, a duplicating device constructed in accordance with the invention is particularly suited for mounting on a vertical turret milling machine 20 including a base 22 which is adapted to rest upon the floor and which supports a table 24 for movement in lateral, to-and-fro and vertical directions. The milling machine includes a domelike turret head 25 which is rotatable on a vertical axis and carries a horizontally extending cylindrical arbor or ram 26 or a dovetail-type ram. A housing 28 is mounted on the rearward end of the ram 26 and supports an electric motor 30 which is connected by a variable speed belt drive 32 to the vertical spindle (not shown) of the milling machine, which normally receives an end mill when the housing 28 is located above the table 24. Commonly, the belt drive 32 provides six selectable speed ratios obtained by shifting a V-belt among different sets of pulleys.

In accordance with the present invention, a three-dimensional duplicating machine 35 includes a horizontally extending member or bracket 36 which mounts on the opposite or forward end portion of the arbor 26. Parallel-spaced flat surfaces 37 (FIG. 2) are formed on the forward end portion of the arbor 26 to receive a complementary surface on the bracket 36 and a plate 38 which is clamped to the bracket 36 by bolts 39. A pair of cylindrical bores 42 are formed within the bracket 36 on opposite sides of the arbor 26, and a corresponding pair of cylindrical antifriction ball bearings 44 extend within the bores 42. A corresponding pair of cylindrical guide rods 45 extend within the bearings 44 to form a preloaded condition of the bearings.

A vertical inner plate member 48 (FIGS. 2 and 4) has a pair of blind counterbores 49 which receive the forward end portions of the guide rods 45, and a pair of screws 51 rigidly secure the plate member 48 to the guide rods 45. A rod 54 extends rearwardly from the plate member 48 through an opening within a split clamping block 55 mounted on the upper surface of the bracket 36. A hand knob 57 is mounted on a threaded fastener extending through the clamping block 55 and serves to lock the to-and-fro movement of the guide rods 45 and the plate member 48 when the knob is tightened. A pair of adjustable stop members 58 are mounted on the rod 54 on opposite sides of the block 55 and serve to limit the to-and-fro movement of the plate member 48 when the knob 57 is released.

The plate member 48 includes a forwardly projecting and laterally extending rail portion 61 on which are mounted the inner races of a pair of linear antifriction ball bearings 62. The bearings 62 support a second or intermediate vertical plate member 65 which carries the outer races of the linear bearing 62. An angle block 67 (FIG. 2) is mounted on the plate member 48 by a screw 68 (FIG. 3) extending from a hand knob 69. The forward edge portion of the angle block 67 is positioned adjacent an upper edge surface of the plate member 65 so that when the knob 69 is tightened, the block member 67 engages the surface 71 and prevents lateral movement of the plate member 65 relative to the plate member 48.

Figure 4:
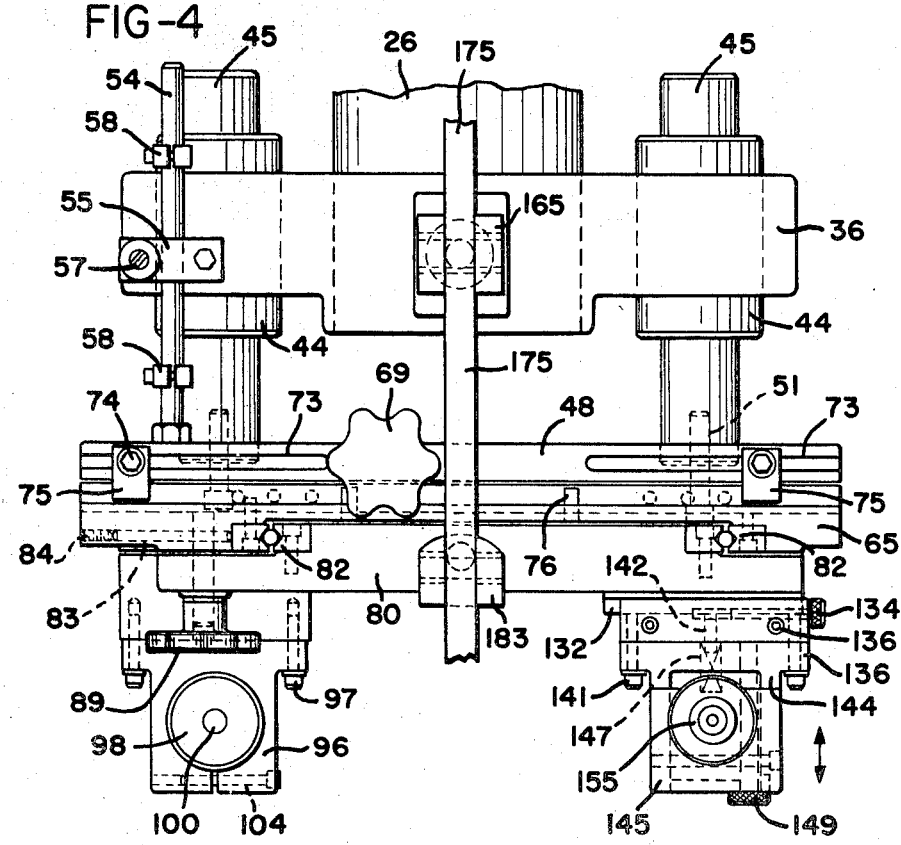
FIG. 4 is a fragmentary plan view of the duplicating device shown in FIGS. 1—3.

Referring to FIG. 4, inverted T-slots 73 are formed within the upper edge surface of the plate member 48 and each slot slidably receives a nut connected by a screw 74 to a stop member 75. A stop pin 76 (FIG. 4) projects rearwardly from the upper portion of the plate member 65 and is adapted to engage the stop member 75 to limit the lateral movement of the plate member 65 relative to the plate member 48. The stop members 75 are laterally adjustable for changing the limits of travel of the plate member 65.

A platelike head member 80 is positioned adjacent the plate member 65 and is connected to the plate member 65 by a pair of horizontally spaced vertical antifriction linear bearings 82 (FIG. 4) which provide for vertical movement of the head member 80 relative to the plate members 48 and 65. The outer race of the left bearing 82 (FIG. 4) is adjustable by a set of pins 83 and screws 84 so that the bearings 82 can be preloaded to eliminate any play between the head member 80 and the plate member 65. Similarly, the outer race of the lower antifriction bearing 62 is adjustable slightly relative to the plate member 65 so that the bearings 62 are preloaded between the plate members 48 and 65.

A vertical slot 87 (FIGS. 1 and 3) is formed within the upper left corner of the head member 80 and receives a threaded stud 88 (FIG. 2) projecting forwardly from the intermediate plate member 65. A hand knob is mounted on the stud 88 and serves to stop vertical movement of the head member 80 relative to the plate member 65 when the knob 89 is tightened. As shown in FIG. 3, a stop pin 92 projects from the left edge surface of the head member 80 and is adapted to engage a pair of stop members 93 adjustably mounted within a vertical slot 94 formed within the plate member 65, and thereby limit the vertical movement of the head member.

A blocklike fitting 96 is secured to the lower left corner portion of the head member 80 by a set of screws 97 and has a split bore which receives a cylindrical bearing 98. A spindle 100 is rotatably supported by the bearing 98 and carries a chuck 102 (FIG. 2) adapted to receive an end mill cutter 103. A screw 104 (FIG. 4) extends within a threaded hole within the fitting 96 and serves to clamp the bearing 98 rigidly within the fitting 96. When the screw 104 is released, the bearing 98 and spindle 100 are adjustable vertically.

Referring to FIG. 3, arcuate slots 106 are formed within the fitting 96 for receiving the screws 97, and a pin or stud 107 extends between the fitting 96 and the head member 80 to provide a horizontal axis of rotation for the fitting 96 and spindle 100 when the screws 97 are released. A series of threaded holes 108 (FIG. 3) are arranged in a circular pattern within the head member 80, and the screws 97 can be selectively inserted into the holes 108 to provide angular adjustment of the fitting 96 and spindle 100 on the axis of the pin 107 of approximately 25° in either direction from the vertical position shown in FIG. 3.

A two diameter pulley 110 is mounted on the lower portion of the spindle 100 and selectively receives an endless flexible belt 112 having a circular cross-sectional configuration. The other end of the belt 112 extends around a pulley 114 mounted on the lower end of the vertical drive spindle (not shown) depending from the housing 28. The belt 112 also extends around a pair of idler pulleys 116 supported by the outer end of an arm 118 mounted on the lower end portion of the housing 28 for rotation on a vertical axis. The two diameter pulley 110 cooperates with the shiftable belt drive 32 to provide the spindle 100 with twelve selectable speeds while the milling machine motor 100 operates at one speed.

A telescopic rod 120 including a clamp fitting 121, has a ball-like forward end portion 122 (FIG. 2) which seats within a semispherical cavity formed within the lower portion of the bearing 98. A universal or swivel bearing 124 connects the rearward end portion of the rod 120 to the arm 118. When the belt 112 is shifted between the pulleys 110, the telescopic rod 120 is adjusted by means of the fitting 121 to maintain a predetermined tension within the belt 112 as the spindle 100 and head member 80 are moved laterally, to-and-fro or vertically relative to the table 24.

A slide block 130 (FIGS. 1 and 4) is mounted on the lower right corner of the head member 80 by a dovetail way 132 and is laterally adjustable on the way 132 by a screw 134. When the block is properly positioned as will be explained later, the block is clamped to the way 132 by tightening a pair of clamping screws 136. A laterally extending slot 137 (FIG. 1) is formed within the block 130 to facilitate clamping of the block on the way 132. A U-shaped fitting 138 is secured to the slide block 130 by a set of screws 139 (FIG. 3) which extend through corresponding arcuate slots 141 formed within the fitting 138. A pin 142 (FIG. 4) also connects the fitting 138 to the slide block 130 and forms a horizontal rotational axis for the fitting 138 when the screws 139 are released, similar to the rotation of the fitting 96 as explained above.

A set of threaded holes 143 are formed within the slide block 130, and the screws 139 can be selectively inserted into the holes 143 to provide substantial angular movement of the fitting 138 corresponding to the angular movement of the fitting 98. The fitting 138 includes a pair of parallel spaced arms 144 which project forwardly to support a slidable block member 145 having an I-shaped cross-sectional configuration. A compression spring 147 extends between the fitting 138 and the block member 145 so that the block member 145 is adjustable to-and-fro by simply rotating the knurled head of an adjustment screw 149 which connects the block member 145 to the fitting 138.

A pair of screws 151 (FIG. 3) extend laterally between the arms 144 of the fitting 138 and through corresponding slots formed within the block member 145. The screws 151 are adjusted to provide sliding movement of the block member 145 between the arms 144 with minimum clearance. A locking screw 152 also extends between the arms 144 and through a slot forming the block member 145 to provide for rigidly securing the block member to the head member 80 after the block member 145 is positioned by adjusting the screw 149. A vertical chuck 155 extends through the block member 145 and is adapted to receive a stylus 156 (FIG. 1). The chuck 155 has upper and lower external threads for receiving a pair of knurled nuts 158 located above and below the block member 145. The nuts 158 provide for adjusting the chuck 155 and the stylus 156 vertically relative to the head member 80.

Figure 2:
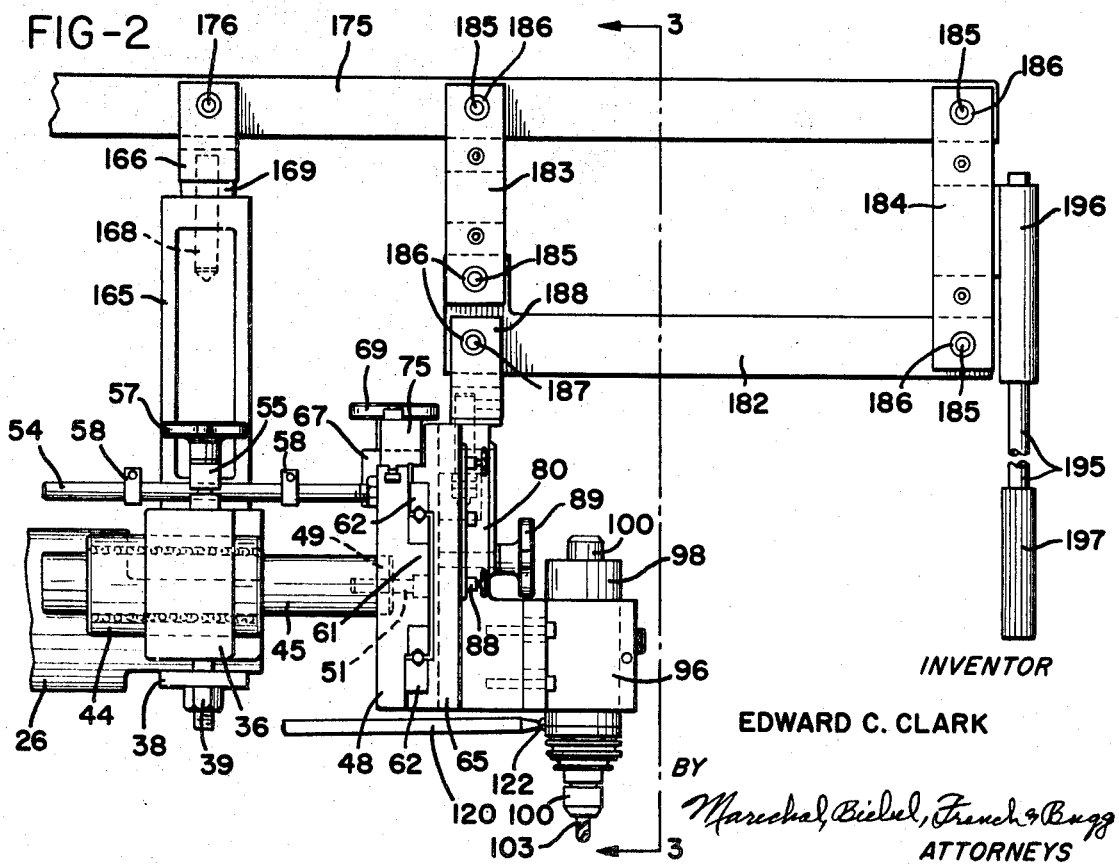
FIG. 2 is a fragmentary elevational view of the duplicating device shown in FIG. 1.
Figure 3:
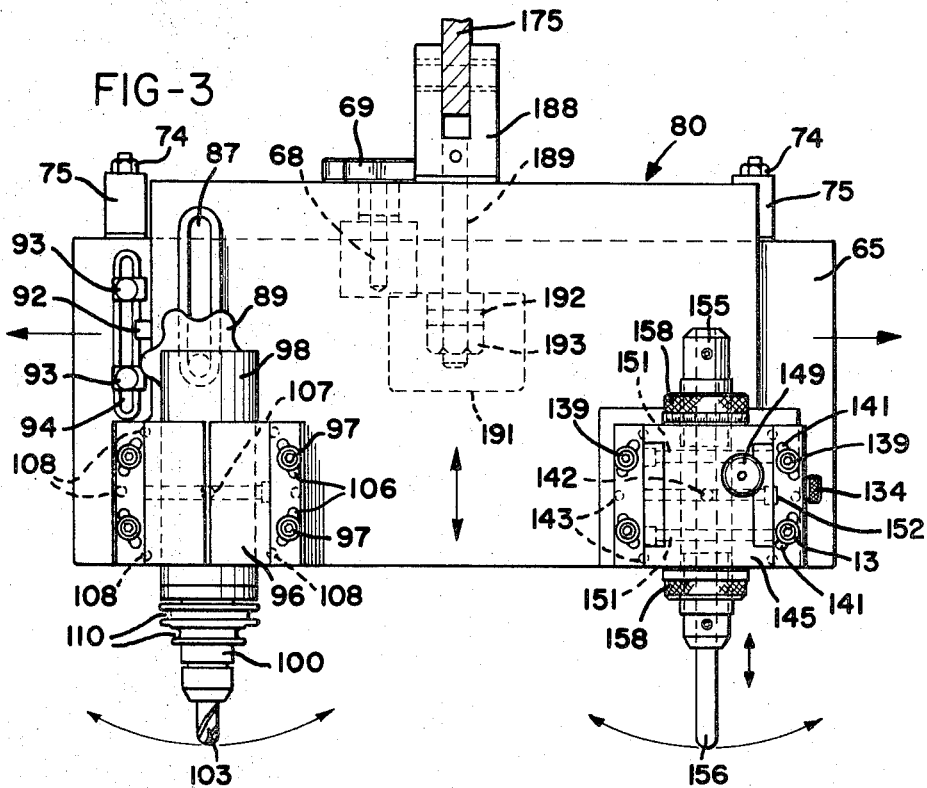
FIG. 3 is a section taken generally on the line 3—3 of FIG. 2.

Referring to FIGS. 1 and 2, a post or column 165 is mounted on the upper surface of the bracket 36 and is positioned within a vertical plane extending through the axis of the arbor 26. A U-shaped yoke member 166 is mounted on the upper end of the column 165 by a pin 168. An antifriction thrust bearing 169 (FIG. 2) is located between the yoke member 166 and the upper surface of the column 165 and cooperates with the pin 168 to support the yoke member 166 for rotation on a vertical axis.

An elongated beam member 175 extends within the yoke member 166 and is supported for pivotable movement on a horizontal axis by a pivot pin 176 mounted in a needle bearing. The forward end portion of the beam member 177 forms the upper link of a parallelogramlike control or linkage system 180 which extends within a vertical plane. The linkage system 180 includes a lower beam member 182 which extends parallel to the beam member 175 and is connected thereto by a set of double vertical link members 183 and 184 and a set of pivot pins 185 extending through corresponding needle bearings 186.

The inner end of the lower beam member 182 is connected by a pivot pin 187 and a needle bearing 186 to a U-shaped yoke member 188 (FIG. 3) secured to the upper end of a shaft 189 which extends through a vertical bore formed within the upper edge portion of the head member 80. A rectangular cavity 191 (FIG. 3) is formed within the rearward surface of the head member 80 and receives an antifriction thrust bearing 192 which is mounted on the lower end portion of the shaft 189 adjacent a nut 193. The yoke member 188 is free to rotate on a vertical axis relative to the head member 80 in the same manner as the yoke member 166 is free to rotate relative to the column 165.

An elongated handle 195 (FIG. 1) depends from a tubular socket 196 secured to the forward link member 184, and a handle grip 197 is mounted on the lower end portion of the handle 195. Since the distance between the two upper pivot pins 185 which extend through the beam 175 is approximately twice the distance between the pivot pin 176 and the upper rear pivot pin 185, the head member 80 moves approximately 1 inch in the lateral and vertical directions for each 3 inches of corresponding movement of the handle grip 197. A similar 3:1 mechanical advantage is provided for moving the head member in a to-and-fro direction as a result of the relative distance between the handle grip 197 and the upper and lower front pivot pins 185.

A weight member 200 is mounted on the rearward end portion of the beam member 175 and includes a set of circular discs 202 rigidly connected by spacers 203 which engage the upper surface of the beam member 175 so that the discs 202 straddle the beam member. A lock screw 204 extends through one of the discs 202 and engages the beam member 175. When the lock screw 204 is released, the weight member 200 is slidable on the beam member 175 to provide for precisely counterbalancing the head member 80, the linkage system 180 and the above-described components mounted on the head member for supporting the cutter 103 and stylus 156.

In operation, a model and a workpiece (not shown) which is to be machined in accordance with the surface contour of the model, are secured to the upper surface of the table 24 by suitable clamps and are spaced apart by a distance generally corresponding to the spaced relation of the cutter 103 and the stylus 156. The stylus 156 is then precisely positioned in lateral, to-and-fro and vertical directions relative to the end mill cutter 103 so that the relative positions of the end mill cutter and the stylus correspond precisely to the relative position of the workpiece and the model. With the motor 30 energized, the operator grips the handle 195 and moves the cutter 103 back and forth over the workpiece until the stylus 156 precisely follows the surface contour of the model.

From the drawing and the above description, it si apparent that a three-dimensional duplicating device constructed in accordance with the invention provides desirable features and advantages. For example, the device provides for conveniently converting a standard vertical turret milling machine into a three-dimensional duplicating machine. That is, to convert a vertical turret milling machine, the turret head 25 is simply rotated 180°, and the duplicating device 35 is mounted on what is normally the rearward end of the ram 26. The arm 118 is mounted on the housing 28, and the pulley 114 is attached to the vertical spindle of the milling machine, enabling the motor 30 of the milling machine to be used to drive the spindle 100 of the duplicating machine through the belt 112.

Another important advantage of the duplicating device 35 is the precise control of the head member 80 with the handle 195. That is, the closely arranged relation of the vertical plate members 48 and 65 and the head member 80, the preloaded antifriction cylindrical bearings 44 and preloaded liner bearings 62 and 82, the counterbalance system through the beam 175 and the rigidity of the linkage system 180 assure that the supported spindle 100 and chuck 155 will precisely follow the handle 195 without any deviation while the end mill cutter is machining the workpiece. In addition, the arrangement of the linkage system 180 and the location of the handle grip 197 provides a substantial mechanical advantage as mentioned above, which is greater than 2:1 and preferably 3:1 so that the handle 195 provides a sensitive control of the movements of the head member. As a result, the workpiece can be precisely machined at a substantially high rate so that the overall time for rough machining and finishing of the workpiece is significantly reduced. Moreover, the location of the handle grip 197 is convenient to an operator positioned directly in front of the table 24 where he can conveniently observe the machining of the workpiece.

The three-dimensional adjustment of the stylus supporting collet or chuck 155 relative to the spindle 100 also provides for minimizing the time required for setting up a duplicating project. For example, instead of trying to obtain precise spacing between the workpiece and the model on the table 24 according to the relative positions of the end mill cutter 103 and stylus 156, the workpiece and the model are secured to the table 24 generally according to the spacing between the stylus and the end mill cutter, and the position of the stylus is precisely adjusted with the aid of the screws 134 and 149 and the nuts 158. As mentioned above, the spindle 100 and the stylus chuck 155 are each supported for angular adjustment on corresponding horizontal axes to provide for selectively positioning the end mill cutter 103 and stylus 156 in corresponding angular relation to the workpiece and model. Furthermore, the knobs 57, 69 and 89 provide for selectively locking the movement of the head member 80 in each of the lateral, to-and-fro and vertical directions if such locking is desired for a particular machining operation. For example, when the device is used only for profiling, the vertical movement of the head member is locked by tightening the knob 89. Moreover, the stop members 58, 75 and 93 provide for conveniently adjusting the limits of movement of the end mill cutter 103 and stylus 156 in each of the lateral, to-and-fro and vertical directions.

While the form of duplicating apparatus herein described constitutes a preferred embodiment of the invention, it is to be understood that the invention is not limited to this precise form of apparatus, and that changes may be made therein without departing from the scope and spirit of the invention.

I claim:

1. In combination with a milling machine including a base supporting a horizontal table, a turret head mounted on said base for rotation on a vertical axis, a horizontally extending ram mounted on said turret head for rotation therewith, and a motor mounted on one end of said ram, a device for machining a workpiece positioned on said table according to the configuration of a model also positioned on said table, said device comprising a support bracket mounted on the opposite end of said ram, a head member, means mounted on said bracket and supporting said head member for selective and precise movement in lateral to-and-fro and vertical directions above said table, a rotary spindle mounted on said head member and adapted to receive a cutter, means mounted on said head member in spaced relation to said spindle and adapted to receive a stylus for engaging the model, a belt drive connecting said motor of said milling machine to said spindle, means for substantially maintaining a predetermined tension within said belt drive during movement of said spindle with said head member, means for counterbalancing the weight of said head member and said spindle and said stylus receiving means, and means adapted to be manually gripped for moving said head member to effect movement of said stylus along the model and corresponding movement of the cutter relative to he workpiece.

2. Apparatus as defined in claim 1 wherein said counterbalancing means comprise a generally horizontally extending beam member, means mounted on said bracket and supporting said beam member for pivotal movement on a generally horizontal axis, link means connecting said beam member to said head member forwardly of said axis, and a weight member connected to said beam member rearwardly of said pivot axis.

3. Apparatus as defined in claim 1 wherein said means adapted to be gripped for moving said head member comprise a generally horizontal beam member extending above said head member generally parallel to said ram, means mounted on said bracket and supporting said beam member for pivotal movement on a generally horizontal axis, a generally parallelogramlike linkage system including link members pivotally connecting said beam member to said head member and disposed in a generally vertical plane, and a handle member connected to said link members.

4. Apparatus as defined in claim 3 wherein said counterbalancing means comprise a weight member mounted on said beam member.

5. Apparatus as defined in claim 1 wherein said means supporting said head member comprise a pair of parallel-spaced cylindrical guide rods positioned on opposite sides of said ram and extending parallel thereto, cylindrical antifriction bearings mounted on said bracket and receiving said rods in preloaded condition, a first generally vertical plate member rigidly connecting the forward ends of said guide rods, a second generally vertical plate member positioned adjacent said first plate member, linear antifriction bearing means mounted on said first plate member and supporting said second plate member for lateral movement in a direction normal to said guide rods, said head member positioned adjacent said second plate member, and linear antifriction bearing means mounted on said second plate member and supporting said head member for vertical movement in a direction normal to said guide rods.

6. Apparatus as defined in claim 1 including means for selectively locking the movement of said head member in each of said lateral, to-and-fro and vertical directions.

7. Apparatus as defined in claim 1 including adjustable stop means for limiting the movement of said head member in each of said lateral, to-and-fro and vertical directions.

8. Apparatus as defined in claim 1 including means for adjustably and selectively positioning said stylus receiving means in lateral, to-and-fro and vertical directions relative to said spindle.

9. Apparatus as defined in claim 1 including means for angularly positioning said spindle and said stylus-receiving means relative to said head member on corresponding horizontal axes.

10. A device adapted to be mounted on a vertical milling machine having a table for supporting a workpiece to be machined in accordance with the configuration of a model positioned on said table, said device comprising a bracket member adapted to be secured to said machine, a head member, means mounted on said bracket member and supporting said head member for selective and precise movement in lateral, to-and-fro and vertical directions above said table, a rotary spindle mounted on said head member and adapted to receive a cutter, means mounted on said head member in spaced relation to said spindle and adapted to receive a stylus for engaging the model, drive means for rotating said spindle, a generally horizontal beam member positioned above said head member, means mounted on said bracket member and supporting said beam member for pivotal movement on a generally horizontal axis, a linkage system pivotally connecting said beam member to said head member and disposed in a generally vertical plane, a handle member connected to said linkage system, and means connected to said beam member for counterbalancing the weight of said head member, said spindle and said stylus receiving means.

11. A device as defined in claim 10 wherein said counterbalancing means comprise a weight member mounted on said beam member.

12. A device as defined in claim 10 including means mounted on said head member for selectively and adjustably positioning said stylus-receiving means in lateral, to-and-fro and vertical directions relative to said head member.

13. A device as defined in claim 10 including means for angularly positioning said spindle and said stylus-receiving means on corresponding horizontal axes relative to said head member.

14. A device as defined in claim 10 including means for selectively locking the movement of said head member in each of said lateral, to-and-fro and vertical directions.

15. A device as defined in claim 10 including adjustable stop means for limiting the movement of said head member in each of said lateral, to-and-fro and vertical directions.

16. A device as defined in claim 10 wherein said means supporting said head member for movement in said lateral, to-and-fro and vertical directions comprise a pair of parallel spaced horizontal cylindrical rods, a corresponding pair of cylindrical antifriction bearings supported by said bracket member and receiving said rods, a first vertical plate member rigidly connecting the forward end portions of said rods, a second vertical plate member positioned adjacent said first plate member, linear antifriction bearing means mounted on said first plate member and supporting said second plate member for horizontal movement in said lateral direction, said cylindrical bearings supporting said first and second plate members for horizontal movement in said to-and-fro directions, said head member positioned adjacent said second plate member, and linear antifriction bearing means mounted on said second member and supporting said head member for movement in said vertical direction.

17. A device as defined in claim 10 including a generally vertical handle member connected to said linkage system and positioned substantially within said vertical plane.

18. A device as defined in claim 10 wherein said linkage system comprises a generally second beam member positioned below the first said beam member, a set of generally vertical link members, a series of pivot pins connecting said link members to said first and second beam members, and an antifriction needle bearing associated with each said pivot pin.

19. A device as defined in claim 10 wherein said linkage system provides a mechanical advantage substantially greater than 2:1 between the corresponding movements of said head member and said handle member to effect precise and sensitive movement of said head member in response to movement of said handle member.